March 19, 1940.  F. E. STAHL  2,194,437
SWIVEL DEVICE FOR TIRE CHAINS
Filed Sept. 27, 1938
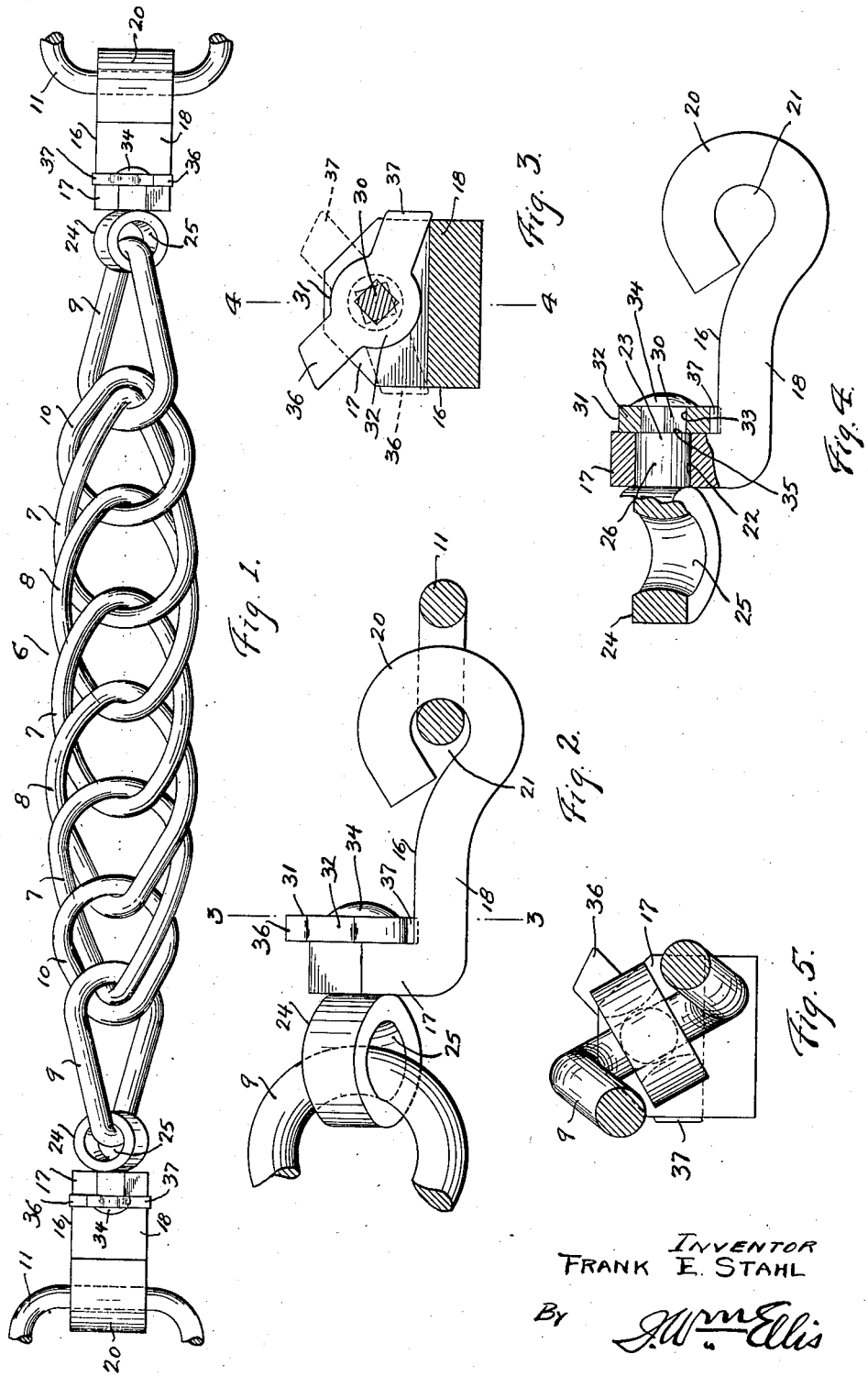
INVENTOR
FRANK E. STAHL
By J. Wm Ellis
ATTORNEY Patented Mar. 19, 1940

2,194,437

UNITED STATES PATENT OFFICE 2,194,437

SWIVEL DEVICE FOR TIRE CHAINS

Frank E. Stahl, Tonawanda, N. Y.; Lillie M. Stahl, administratrix of the estate of said Frank E. Stahl, deceased, assignor to Columbus McKinnon Chain Corporation, Tonawanda, N. Y., a corporation of New York Application September 27, 1938, Serial No. 231,959

6 Claims. (Cl. 152—233)

My invention relates in general to swivels and particularly to a swivel which permits a limited amount of relative movement between the parts thereof.

It is well known to those skilled in the art that at present tractors and other farm or road implements are provided with large pneumatic tires, and that it is usually necessary to use additional traction means. I have found that it is preferable to use a twisted chain in connection with such a traction device and that it is desirable to place in the chain an initial twist when it is assembled to the side chains. Such a chain, I have found, will normally lie flatly against the tire, but when traction is needed, such initial twist will permit the chain to be rotated on its longitudinal axis and the links will be caused to stand substantially on edge, thereby providing maximum traction, as clearly described in my co-pending application Serial No. 145,715 upon Antiskid cross chains, filed June 1, 1937, and also in my co-pending application Serial No. 200,953 upon a Method of making chains, filed April 8, 1938.

Such cross chains may be made from links each provided with the necessary amount of twist to permit the chain to be given the desired amount of initial twist as it is fastened permanently to the side chains of the anti-skid device. However, where it is desired to reduce the twist in each link, the total amount of initial twist necessary between the ends of the chain may be secured by means of a swivel device by which a limited amount of additional twist is provided, which is the subject of this application.

It is an object of the present invention to provide swivel means by which such a cross chain may be connected to the side chains of an antiskid device, whereby a limited amount of swiveling movement may be provided for between the ends of the chain and the side chain.

Another object has been to provide a device of this nature which shall be rugged in construction and operation.

The above objects and advantages have been accomplished by the device shown in the accompanying drawing, of which:

Fig. 1 is a plan view of a twisted cross chain with one of my devices shown connecting each end of the chain to the links of a side chain of an anti-skid device.

Fig. 2 is an enlarged, side elevation of the device.

Fig. 3 is a transverse, sectional view taken on line 3—3 of Fig. 2.

Fig. 4 is a fragmentary, sectional view through the swivel member, taken on line 4—4 of Fig. 3.

Fig. 5 is an end elevation of my swivel device showing the joiner link 11 broken away.

In Fig. 1 of the drawing where I have shown my device in use, 6 represents the cross chain which is preferably made of a series of interengaged links 7 and 8, forming two independent chains which have their ends connected to joiner links 9, one arranged at each end of the cross chain. The joiner links are connected directly to the end links 7 of one chain, and such joiner links are connected to the end links 8 of the other interengaged chain by means of ring links 10. In the drawing I have indicated at each end of the cross chain one of the links 11 of the side chains of an anti-skid device, which is a standard article of manufacture and does not need, therefore, to be further shown or described.

As hereinbefore stated, when the links of the cross chain with which my device is to be used are not given sufficient twist to produce the desired amount of initial twist in the completed chain when being assembled, the additional twist necessary between the ends of the chain may be provided for by my swivel device. Obviously, it is desirable to have the connection between the cross chain and the link of the side chain perpendicular to each other, or so arranged that normally there shall be no cramping, and consequent abnormal wear, between the parts. As shown in the drawing, one of my swivel devices is used to connect the joiner link 10 at each end of the chain with the link 11 of the side chain of the anti-skid device and, as shown, the extreme end of the joiner link 9 lies in a plane which is not perpendicular to the plane in which the link 11 of the side chain is arranged. The swivel device thus provides for the difference in angle between the end of the joiner link and the link of the cross chain, as shown in the drawing. In the position shown, the stop arm 35 will normally keep the joiner link in substantially the position shown but will permit the joiner link to rotate through a limited arc when the cross chain is brought into active position. Undue rotation of the joiner link and, therefore, the cross chain will, however, be stopped by the engagement of the stop arm 37 with the top surface of the base part 18 of the body part 16 of my swivel.

Each of the swivels of my invention comprises a body part 16 and a swivel member 24. The body part, which is preferably made of steel of rectangular cross-section, as shown in Fig. 3, has a base portion 18. Extending upwardly from the base portion of the body part, and preferably at right angles thereto, is an upstanding bearing portion 17. At the opposite end of the body part is a return bend portion 20, whereby an eye 21 is provided, with which the link 11 of the side chain of an anti-skid device is connected, as clearly shown in this figure and in Fig. 1.

The bearing portion 17 of the swivel is provided with a bearing aperture 22 for the reception of the stud 23 of the swivel member 24. The swivel member is preferably ring-shaped, as shown in Fig. 1, having an opening 25 for the reception of the joiner link 9 of the cross chain. The stud 23 of the swivel member is formed with a cylindrical portion 26 which is preferably as long as, or slightly greater than, the width of the bearing portion 17 in which it is mounted. The stud, however, extends inwardly beyond the inner surface of the bearing portion of the body part and is provided with a stud portion 30 of polygonal cross-section, preferably square, upon which is mounted, in non-rotatable manner, a stop member 31. This stop member is provided with a central portion 32 in which is formed an aperture 33 of the same shape as the portion 30 of the stud. This aperture is preferably closely fitted to the stud and the outer end 34 of the stud extends sufficiently beyond the outer face of the stop member so as to permit the stud to be riveted over upon the stop member and thus hold the same in place. The polygonal portion 30 of the stud is preferably smaller in diagonal dimension than the diameter of the bearing portion 26, so that a suitable shoulder 35 is provided against which the stop member is held.

The stop member is provided with two stop arms 36 and 37 so arranged and proportioned that they permit the swivel member to rotate through a definite predetermined number of degrees with respect to the body part 16 of the device. The amount of rotation of the swivel member is limited by the stop arms 36 and 37 which contact with the upper surface of the base portion 18 of the body part 16 of the device.

From the foregoing, it will be obvious that when a cross chain of the type shown and described in my co-pending applications, having insufficient initial twist, is to be connected to side chains by means of my swivel devices, the swivel devices will make up for the additional twist needed. As shown in the drawing, the swivel members, when completely assembled in the anti-skid device, have their arms 36 at opposite ends of the chain contacting with the base portions 18, thus maintaining the desired amount of initial twist in the chain. When, however, traction is needed and the chain is turned upon its longitudinal axis by the material through which it is being passed, either of the swivel members of my devices will be rotated from the position shown in Fig. 3 in full lines to the position shown in this figure in dotted lines, depending upon the direction of movement of the wheel bearing the device. Clearly, the dotted line position shows the arm 37 in contact with the base portion 18. Such movement will allow the chain to be free to rotate upon its axis the desired amount and will cause the same to be stopped at a predetermined point in the rotation where the cross chain is producing its maximum traction.

Having thus described my invention, what I claim is:

1. The combination with an anti-skid device having side chains and cross chains, each having an initial twist between its ends and designed to partially rotate on the periphery of the tire, of a swivel device, comprising a body part provided with means for attaching it to said side chain, a swivel member for connection to the end of the cross chain, said swivel member being rotatably mounted in said body part, and means for limiting the movement of the swivel member with respect to the body part.

2. The combination with an anti-skid device having side chains and cross chains, each having an initial twist between its ends and designed to partially rotate on the periphery of the tire, of a swivel device at each end of each cross chain, each comprising a body part provided with means for attaching it to said side chain, a swivel member formed with an eye for the reception of the end link of the cross chain, a cylindrical portion formed on the swivel member and disposed in a suitable bearing in the body member for permitting relative rotation thereof, and means carried by the cylindrical portion of the swivel member for limiting the rotation thereof.

3. The combination with an anti-skid device having side chains and cross chains, each having an initial twist between its ends and designed to partially rotate on the periphery of the tire, of a swivel device at each end of each cross chain, each comprising a body part having a base portion, a return bend portion at one end thereof for connection to the side chain, and a bearing portion at the opposite end thereof, said bearing portion being arranged at right angles to the base portion and formed with an aperture, a swivel member provided with a cylindrical portion for engagement with the aperture of the bearing portion of the body part, said swivel member having an aperture for the reception of the end link of the cross chain, and means for limiting the amount of rotation of the cylindrical portion in the aperture of the body part.

4. The combination with an anti-skid device having side chains and cross chains, each having an initial twist between its ends and designed to partially rotate on the periphery of the tire, of a swivel device at each end of each cross chain, each comprising a body part having a base portion, a return bend portion at one end thereof for connection to the side chain, and a bearing portion at the opposite end thereof, said bearing portion being arranged at right angles to the body part and formed with an aperture, a swivel member provided with a cylindrical portion for engagement with the aperture of the bearing portion of the body part, said swivel member having an aperture for the reception of the end link of the cross chain, and a stop member carried by the swivel member for engagement with the base portion of the body part for limiting the rotation of the swivel member.

5. The combination with an anti-skid device having side chains and cross chains, each having an initial twist between its ends and designed to partially rotate on the periphery of the tire, of a swivel device at each end of each cross chain, each comprising a body part having a base portion, a bearing portion at one end thereof arranged at right angles thereto, said bearing portion being formed with an aperture, a swivel member for connection to the end of the cross chain, said swivel member being formed with a cylindrical portion for rotatable engagement with the aperture of said bearing portion, said swivel member having a stud of polygonal shape extending from the cylindrical portion, a stop member having a polygonally-shaped aperture, engageable with the stud, means for securing the stop member to the swivel member, means carried by the body portion for connecting it to the side chain, and means formed on the swivel member for connecting it to the end link of the cross chain.

6. The combination with an anti-skid device having side chains and cross chains, each having an initial twist between its ends and designed to partially rotate on the periphery of the tire, of a swivel device at each end of each cross chain, each comprising a body part having a base portion, a bearing portion at one end thereof arranged at right angles thereto, said bearing portion being formed with an aperture, a swivel member for connection to the end of the cross chain, said swivel member being formed with a cylindrical portion for rotatable engagement with the aperture of said bearing portion, said swivel member having a stud of polygonal shape extending from the cylindrical portion, a stop member having a polygonally-shaped aperture, engageable with the stud, means for securing the stop member to the swivel member, said stop member having two oppositely-arranged stop arms for engagement with said base portion for limiting the amount of rotation of the swivel portion therewith, means carried by the body portion for connecting it to the side chain, and means formed on the swivel member for connecting it to the end link of the cross chain.

FRANK E. STAHL.